United States Patent
Bolton et al.

[11] Patent Number: 5,496,640
[45] Date of Patent: Mar. 5, 1996

[54] FIRE RESISTANT TRANSPARENT LAMINATES

[75] Inventors: Nelson Bolton, Trumbauersville; W. Novis Smith, Philadelphia, both of Pa.

[73] Assignee: Artistic Glass Products Company, Trumbauersville, Pa.

[21] Appl. No.: 290,178

[22] Filed: Aug. 15, 1994

[51] Int. Cl.⁶ .................................... B32B 27/06
[52] U.S. Cl. .................. 428/421; 428/34; 428/220; 428/332; 428/410; 428/412; 428/422; 428/426; 428/441; 428/442; 428/920; 428/921; 52/786.11; 52/786.13; 52/232
[58] Field of Search ............... 428/34, 38, 421, 428/422, 426, 441, 442, 911, 920, 921, 412, 332, 220, 410; 52/788, 789, 786.1, 786.11, 786.13, 232

[56] References Cited

U.S. PATENT DOCUMENTS 4,059,469  11/1977  Mattimoe et al. ............... 156/108
4,563,393  1/1986  Kitagawa et al. ................ 428/412
5,124,208  6/1992  Bolton et al. ................... 428/412
5,230,954  7/1993  Sakamoto et al. ............... 428/332

*Primary Examiner*—Patrick J. Ryan
*Assistant Examiner*—Marie R. Yamnitzky
*Attorney, Agent, or Firm*—John Lezdey

[57] ABSTRACT

A fire resistant and impact resistant transparent laminate comprising at least two spaced parallel sheets of transparent material selected from the group consisting of ceramic glass and polymeric material, at least one optically transparent fluorocarbon polymer modified with polar groups, at least one optically transparent glass or resinous inner layer between said parallel sheets, and at least one layer of an optically transparent intumescent gel on at least one side of said inner layer.

19 Claims, 1 Drawing Sheet

FIRE RESISTANT TRANSPARENT LAMINATES

FIELD OF THE INVENTION

The present invention relates to fire resistant, impact resistant, transparent laminates for protective doors and/or windows. More particularly, the invention provides transparent laminates comprising an arrangement of transparent panels which includes at least one fire resistant, impact resistant optically transparent thermoplastic fluorocarbon polymer modified by polar groups as an inner layer and optionally, as an inner layer optically transparent glass, resinous and/or intumescent material.

DESCRIPTION OF THE PRIOR ART

In security installations there are presently being utilized transparent laminates of glass, polyurethane, polycarbonate and ionomers as protective barriers. Moreover, optically transparent laminates which are used in prisons, psychiatric institutions and commercial buildings must not only be resistant to physical and ballistic attacks, but capable of withstanding high heat and direct flames for a prolonged period of time to permit people to move to safety or for assistance to arrive. This combination of impact resistance has been difficult to achieve satisfactorily.

To provide security or armor glass with resistance to cracking and breaking during high heat and flames, it was common to include in the glass pane a wire mesh. However, such a solution to the problem resulted in a loss of transparency and aesthetic appearance. Moreover such windows cracked readily to permit heat to reach the other side of the window.

Other methods for forming fire resistant windows include providing an intumescent gel layer sandwiched over the outer sheet with a frame that allows for expansion as taught in French Patent No. 2,321,575.

In British Patent No. 1,35,497 there is disclosed a fireproofing glass reinforced plastic which is formed by adding woven glass roving to a surface and applying a resin absorbing tissue and a coating of intumescent gel. However, the optical clarity is affected.

It is known to make fire resistant panes for non-security installations by placing between two sheets of glass a solid layer of a product which under the action of heat radiation is transformed into an insulating foam, for example, a hydrated alkaline silicate. Such panes are described in French Patent No. 2,027,646. Such panes have poor optical transparency and are not reliable for long periods of time. Also, the panes cannot deter physical attacks.

British Specification No. 1,541,371 provides a fire resistant pane which comprises at least two parallel glass sheets separated by a space filled with a gel. The gel is capable of forming a heat insulating foam under the effects of thermal radiation. Such gels are capable of being utilized in the present invention. However, the arrangement disclosed cannot be utilized for a security installation.

British Patent Specification No. 1,541,371, which is herein incorporated by reference, discloses fire resistant gels and attachment means which could be used in the present invention.

U.S. Pat. No. 4,368,226 to Mucaria discloses a glazing unit comprising a pair of parallel sheets having a polycarbonate inner layer. However, there is a void between the inner and outer layers.

U.S. Pat. No. 4,312,903 to Molari discloses an impact resistant double glazed structure. The double glazed structure has a resinous layer laminated between two parallel outer sheets. According to one embodiment there is a space between the laminates.

U.S. Pat. No. 4,321,777 discloses a composite panel having high impact resistance which comprises sheets of glass having interposed therebetween a sheet of plastic material and a film of a transparent fluid such as glycol.

U.S. Pat. No. 4,799,346 to Bolton et al, which is incorporated herein by reference, discloses a laminated glazing unit which has interposed therebetween sheets of glass or plastic ionomer, and which is useful in the present invention.

These is an existing need for improved fire resistant windows in building construction for fire wall doors, observing hazardous operations, etc.

SUMMARY OF THE INVENTION

The present invention provides impact resistant and fire resistant transparent laminates comprising at least two spaced parallel sheets of transparent material, selected from glass and/or polymeric materials, at least one optically transparent modified thermoplastic fluorocarbon polymer modified by polar groups selected from hydroxyl, carboxyl, urethane and mixtures thereof and having melting points in the range of about 120° to 300° C., optimally, at least one optically transparent glass or resinous inner layer between said parallel sheets, and optionally, at least one layer of an optically transparent intumescent gel on at least one side of the resinous inner layer, and means for attaching the glazing unit to a supporting structure.

Advantageously, the inner resinous layer is an ionomer when the laminate is to provide penetration resistance and maximum security. The intumescent gel acts both as a coolant for the resinous inner layer and as a dampening agent during an attack by a blunt object. If the laminate is to also perform as a fire barrier, the intumescent gel can be placed on both sides of the resinous layer.

In order to ensure that the resinous inner layer does not react with the intumescent gel and to allow use of the arrangement with a wide variety of gels, it is preferable to provide an inert layer or barrier coating on the side of the resinous layer adjacent the gel. For example, a thin sheet of glass can be utilized or a barrier coating of an inert material such as siloxane may be applied.

The use of the gels provides the additional benefits of acting as a cooling and dampening agent. Many of the resins lose strength at elevated temperatures so the gel acts by providing a cooling effect. Furthermore, during an attack, the gel provides a dampening effect and prevents vibration which can weaken the laminate.

In its broadest aspect, the present invention relates to a fire resistant, impact resistant and optically transparent laminate comprising at least two spaced parallel sheets of transparent material selected from glass, ceramic and polymeric material, at least one interlayer of an optically transparent thermoplastic fluorocarbon polymer film modified by polar groups and having melting points in the range of 120° to 300° C.

These fluorocarbon films have excellent adhesion to glass and polymeric materials. Laminates having interlayers of these fluorocarbon films have enhanced fire resistance over laminates containing other laminating resin films.

Therefore, it is an object of the present invention to provide a fire resistant laminate.

3

It is a further object of the invention to provide a security laminate which possesses a good optical transparency.

It is a still further object of the invention to provide a heat resistant, projectile resistant optically transparent laminate for psychiatric institutions, windows of vehicles or security installations.

It is a yet further object of the invention to provide a fire resistant glazing unit which does not degrade and/or delaminate.

It is another object of the invention to provide a cushion means in laminates to allow for temperature related expansion of glass.

Other objects and a fuller understanding of the invention will be had by referring to the following description and claims of a preferred embodiment, taken in conjunction with the accompanying drawings, wherein like reference characters refer to similar parts throughout the several views.

DESCRIPTION OF THE PREFERRED EMBODIMENTS

Figure 1:
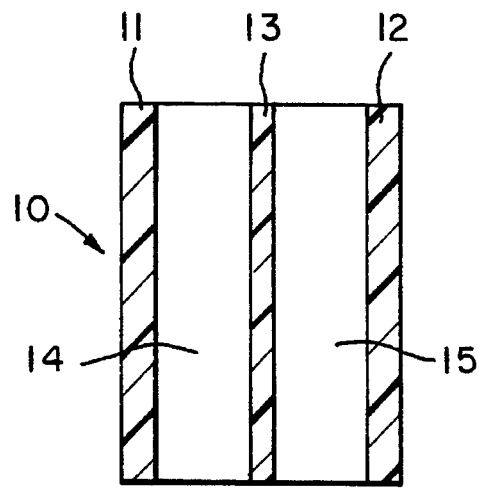
FIG. 1 is a fragmentary sectional view of a single interlayer of the modified thermoplastic fluorocarbon polymer film of the invention.

Although specific terms are used in the following description for the sake of clarity, these terms are intended to refer only to the particular structure of the invention selected for illustration in the drawings, and are not intended to define or limit the scope of the invention.

It is understood that the following description omits many structural elements commonly found in laminating glazing units for aircraft, such as mounting frames, like those found in U.S. Pat. No. 3,410,739 to Orcutt, temperature sensing devices, like those shown in U.S. Pat. No. 3,789,191 to Spindler, reinforcing frames, like those shown in the aforesaid Orcutt and Shorr patents and other structural elements well known in the art.

Referring now to the accompanying drawings, FIG. 1 illustrates a typical art laminate for a glazing unit wherein a pair of outer sheets 11, 12 is separated by a fire resistant thermoplastic fluorocarbon polymer film 13. The outer sheets 11, 12 may be glass or polycarbonate. Such a structure may be suitable for security installations or to resist penetration by projectiles or blunt instruments. Spaces 14 and 15 may be filled with an intumescent gel.

Figure 2:
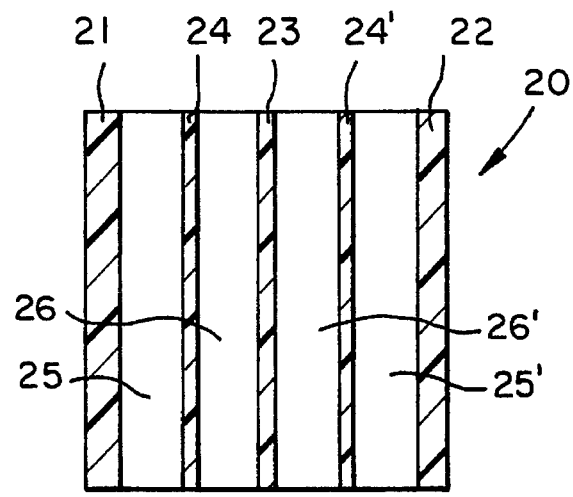
FIG. 2 is a fragmentary sectional view of a plurality of interlayers having at least one layer of the modified thermoplastic fluorocarbon polymer film of the invention and optionally at least one layer is a resinous layer.

FIG. 2 shows an arrangement wherein a laminate 20 is provided with an inner layer 23 which is a glass that is adjacent on both sides to spaces 26, 26'. The outer layers 21, 22 of the laminate 20 are glass. However, one of the outer sheets or layers 21, 22 can be polycarbonate and one of the inner layers 24, 24' may be also made of ceramic glass with the other inner layer 24, 24 being a fluorocarbon polymer.

4

Spaces 25, 25', 26 and 26' may be filled as described above in FIG. 1.

Figure 3:
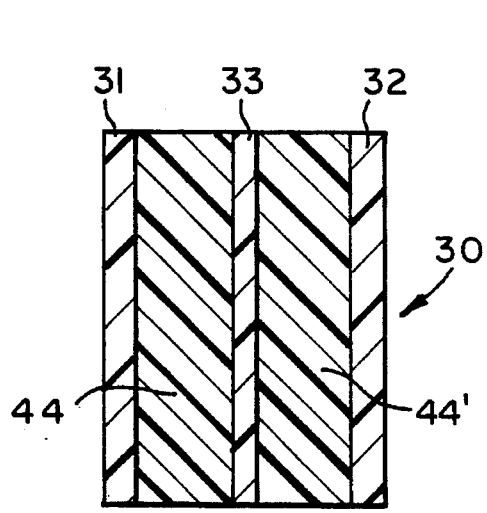
FIG. 3 is a fragmentary sectional view of a single interlayer of the modified thermoplastic fluorocarbon polymer of the invention including a plurality of layers of intumescent gel.

FIG. 3 shows a laminate 30 comprising outer sheets 31, 32 and an inner optically transparent thermoplastic fluorocarbon polymer layer 33 which is in contact on both sides with intumescent gel layers 44, 44'.

Figure 4:
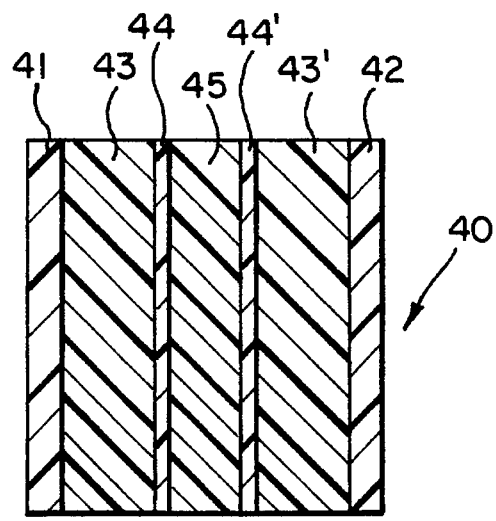
FIG. 4 is a fragmentary sectional view of a plurality of the modified thermoplastic fluorocarbon polymer of the invention and where at least one interlayer is an intumescent gel.

FIG. 4 shows a laminate 40 wherein outer glass sheets 41, 42 have adjacent to them optically transparent thermoplastic fluorocarbon polymer sheets 43, 43' and an ionomer sheet 45, which acts as load bearing member with an intumescent gel 44, 44' forming an inner separation and shock dampening layer. In this case a single layer of gel along with the fluorocarbon polymer sheets 43, 43' provide the fire resistance and dampening to the reinforced outer layers 41, 42.

In a simple form, a glazing unit may be provided which has a laminate of any of the different forms shown in FIGS. 1–4. The laminate can be held within a frame in a conventional manner, for example, as disclosed in any one of U.S. Pat. Nos. 4,321,777, 4,368,226, 2,244,489 or the like. The frame can be provided with means for security to a support structure in a manner dependent upon use and location of the structure. The glazing unit may be secured to a supporting structure by bolts or other conventional means. To further secure the laminate in the frame, the space in the frame may be filled with high impact strength resins. Suitable resins include epoxy resins, thermosetting phenolic resins, polymers of caprolactam, and the like. U.S. Pat. No. 4,593,070 to Oyama et al and U.S. Pat. No. 4,593,073 to St. Pierre et al, which are herein incorporated by reference, disclose suitable resins.

The thickness of the outer layer of the laminate is usually about 20 mils. The inner resinous layer is usually greater than 30 mils, generally about 50 or 60 mils. However, for maximum security the outer layers as well as the inner layers may have a thickness greater than 50 mils. The various thicknesses depend on location and use of the laminate.

It is also understood that while the present invention illustrates an interlayer of extruded transparent plastic material, the term "interlayer", as it is contemplated for use in the present invention, may comprise one or more layers of extruded transparent plastic material bounded to one another and made integral to one another with intermediate layers of transparent material of either a rigid or flexible nature therebetween.

The preferred "interlayer" of the present invention comprises optically transparent thermoplastic fluorocarbon polymer films modified by polar groups selected from hydroxyl, carboxyl, urethane and mixtures thereof and having melting points in the range of about 120° to 300° C. These films are modified by the addition of oxygen containing monomers such as ethylene oxide, methacrylate and acrylate esters and acids, diisocyanates and epoxides in the quenching step of the polymerization. Then, the modified fluorocarbon polymers, upon exposure to high temperatures or an opening flame, char but do not burn.

The modifiable fluorocarbon polymers of this invention comprise at least one monomer of tetrafluoroethylene, hexafluoropropene and vinylidene fluoride. The preferred modifiable fluorocarbon polymers comprise homopolymers and copolymers of vinylidene fluoride with ethylenically unsaturated monomers selected from hexafluoropropene, tetrafluoroethylene and mixtures thereof. The preferred modifiable fluorocarbon polymers are shown in the following TABLE 1:

| Structure/Module | Melting °C. | Monomers/% p. W. | | |
|---|---|---|---|---|
| | | TFE | HFP | VDF |
| —(CF$_2$—CF$_2$)$_x$—(CF—CF$_2$)—$_y$<br>                          CF$_3$ | 260—270 | ~80 | ~20 | 0 |
| —(CF$_2$—CH$_2$)—$_n$ | 160—180 | 0 | 0 | 100 |
| —(CF$_2$—CH$_2$)$_x$—(CF—CF$_2$)—$_y$<br>                          CF$_3$ | 135—145 | 0 | <10 | >90 |
| —(CF$_2$—CF$_2$)$_x$—(CF—CF$_2$)—$_y$—(CF$_2$—CH$_2$)—$_z$<br>                          CF$_3$ | 125—130 | ~40 | ~20 | ~40 |
| —(CF$_2$—CF$_2$)$_x$—(CF—CF$_2$)—$_y$—(CF$_2$—CH$_2$)—$_z$<br>                          CF$_3$ | 150—180 | ~60 | ~20 | ~20 | wherein x, y and z are 1 to 1000 and n is 1 to 2000.

The amount of vinylidene fluoride (VD) in the copolymer can range from about 10 to 90 weight percent. Most preferred are modified thermoplastic terpolymers comprising from about 20 to 60 weight percent tetrafluoroethylene (TFE), from about 20 to 40 weight percent hexafluoropropene (HF) and about 20 to 40 weight percent vinylidene fluorides.

Specific examples of the most preferred modifiable thermoplastic terpolymer fluorocarbons are:

40% vinylidene fluoride

40% tetrafluoroethylene

20% hexafluoropropene and:

60% tetrafluoroethylene

20% vinylidene fluoride

20% hexafluoropropene

When modified, these modifiable thermoplastic fluorocarbon polymers are optically transparent and provide excellent adhesion to glass and plastics. Unmodified fluorocarbon polymer films generally are used as release agents and do not bond to glass. However, modified fluorocarbon polymer films having sufficient levels of polar groups provided by the incorporation of the oxygen containing monomers, will enhance the binding to glass and plastic surfaces by hydrogen bonding.

These preferred polymers are sold by 3M as THV Fluoroplastics under series 200, 300, 400 and 500 where they differ in melting point and chemical resistance. E-beaming without pro-rads improves high temperature resistance.

In cases where the fire resistant film does not adhere to the glass or gel, a thin adhesive layer may be interposed between the glass or gel and the fluorocarbon polymer. The adhesive layer may be a polyurethane, transparent ionomer or an acrylic adhesive such as RHOPLEX manufactured by Rohm and Haas, Philadelphia, Pa.

The preferred "interlayer" herein contemplated also includes structures comprising rigid plies of coated or uncoated glass or ionomer or polycarbonate or acrylic or polyester and/or flexible plies of polyurethane, and other esters commonly used as interlayer materials or combinations of rigid and flexible materials within the outer plies of extruded transparent plastic material. Therefore, the "interlayer" has outer surfaces of extruded transparent plastic material facing a glass surface or a coated glass surface.

The interlayer may also comprise one or more layers of polyurethane, polyvinyl butyryl resin, polyethylene, terephthalate, commercially available as DuPont's MYLAR®, polyesters, ionically cross-linked ethylene-methacrylic acid copolymer or ethylene-acrylic acid copolymer, which may be neutralized with a polyamine, or the like.

The polyurethanes preferably used according to the principles of the present invention can broadly be described as the reaction product of a polyisocyanate and polyol, which upon lamination forms a transparent layer. The polyurethanes may have thermosetting or thermoplastic properties. Thus, for example, an organic diisocyanate is reacted with a relatively long chain diol and curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocyclic diiocyanates. Examples are 2,4- and 2,6-toluylen diisocyanate, 1.4-butane diisocyanate, 1,2-isocyanato-methyl cyclobutane, 4,4-methylene-bis (cyclohexyl isocyanate), 1,10-decane diisocyanate, and furfurylidene diisocyanate.

Suitable long chain diols include polyester diols. The polyester diols can be prepared by the polyesterification reaction of a aliphatic dibasic acid or an anhydride thereof with a diol, preferably an aliphatic diol. Suitable aliphatic dicarboxylic acids can be represented by the formula HOOC-R-COOH wherein R is an alkylene radical containing from 2 to 12, and preferably 4 to 8, carbon atoms inclusive, examples of which are adipic, succinic palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3000. The preferred polyester diol is poly 1,4-butylene adipate having a molecular weight of about 1800 to 2200. The polyurethane is preferably used in sheets of about 10 mils to 45 mils in thickness.

The ionomer resin which can be used in the invention is obtained by combining a copolymer of ethylene-methacrylic acid or ethylene-acrylic acid and a polyamine. In addition, the copolymer may already be partially neutralized with up to 90% of a metal cation such as sodium or other alkali metal, or ammonium, zinc and aluminum salts. A particular example of such a copolymer is SURLYN 1601, manufactured by the Polymer Products Department of the DuPont Company, Wilmington, Del. or an ionomer sold under the trademark NOVIFLEX by Artistic Glass Products, Inc. of Trumbauersville, Pa.

The outer sheets and/or inner sheets which may be used in the invention may be any well known commercial plate, float or sheet glass composition, annealed glass, tempered glass, chemically strengthened glass, PYREX® glass, borosilicate glasses, lithium containing glasses, PYROCERAM®, lithium containing ceramics, nucleated ceramics, polycarbonate resin, fused acrylic/polycarbonate resins, acrylic resins, polyurethanes, ionomer resins, allyl diglycol carbonate resins and the like. The polycarbonate is generally used in sheets of about 5 to 250 mm in thickness. The sheets may be coated with a abrasion resistant coating. Generally the outer layers of the window have a minimum thickness of 0.25 mm.

A preferred outer sheet is a glass-ceramic sold by Schott Glaswerke of Germany under the trademark ROBAX and/or the glass sold by McGrory Glass Co. under the trademark FIRELITE.

The intumescent gels used in the invention should be optically transparent and substantially non-degradable upon standing for long periods of time. The gels typically contain over 30% water and salts, alcohols or glycols to depress the freezing point. Foaming agents may be added. Intumescent materials which are not gels, such as the clear polyurethane coatings disclosed in U.S. Pat. No. 3,497,469, do not provide good optical clarity. In addition, such materials have a tendency to delaminate. The layers of gel are generally about 0.25 to 0.5 inches in thickness. It has been found that the gel not only provides the resistance to heat and fire but additionally provides a cushion which prevents chipping and stress cracking when installing in a supporting frame and as a thermal expansion cushion for the adjacent layers.

Primers may also be used to promote adhesion between the ionomer resin and the glass and polycarbonate, respectively. Primers suitable for glass, and the glass/ionomer resin interface in particular, may include silanes, such as those produced under the registered trademarks "Z-6040" and "Z-6020" by Dow Chemical Company. Other primers suitable for the polycarbonate/ionomer resin interface in particular, include organic amines, usually in a diluted solution with an inert solvent (that is unlikely to attack the polycarbonate, e.g., alkanes and alcohols), such as aliphatic or polyethylene amines or ethanolamines, and specifically diethylenetriamine. Other specific primers include diisocyanates (toluene diisocyanate) and polyacrylic acid (produced under the registered trademark ACRYSOL by the Rohm and Haas Company.

In some cases, primers may also be used to promote adhesion of the intumescent gels to their adjacent surfaces.

When the outside surface is a polymeric sheet, it is sometimes advisable to provide the exposed surface with a hard coat to prevent scratch, abrasion or other damage. Useful hard coats which have optical clarity are organosilicone products such as those described in U.S. Pat. No. 4,027,073. These products can also serve as barrier coatings.

Specific embodiments of the above basic panel may assume various shapes and the arrangement of the panel components may vary depending upon particular design requirements. Additional components such as temperature control sensing devices may be incorporated into the basic panel structure.

The sheets of glass used in the panel may be of the same or different sizes. The peripheral margins of the interlayer materials may be cut flush with the edges of adjacent glass sheets to provide in itself a resilient means for supporting the laminated glass assembly. The interlayer may be provided with inserts which have characteristics that inhibit delamination, a phenomenon known as "cold chipping". Where an interlayer has extended portions, these portions may include interlayer inserts for reinforcement of the interlayer material. Electrical terminal blocks may be mounted on any desired surface of the panel which is accessible for power lead attachment purposes when the panel has been mounted on the support body.

The laminated articles of this invention have utility in a variety of different environments including security installations, armored vehicles, banks, factories, airplanes, space vehicles, submersibles, and the like.

The form of the invention shown and described herein represents an illustrative preferred embodiment and variations thereof. It is understood that various changes may be made without departing from the essence of the invention as defined in the claims.

What is claimed:

1. A fire resistant, impact resistant and transparent laminate comprising at least two spaced parallel sheets of transparent material and at least one interlayer, said interlayer comprising an optically transparent thermoplastic fluorocarbon polymer, said fluorocarbon polymer being modified by polar groups and having a melting point in the range of about 120° to 300° C., wherein said polar groups are selected from carboxyl groups, urethane groups and hydroxyl groups.

2. The laminate of claim 1, wherein said fluorocarbon polymer is modified by the addition of oxygen containing monomers in the quenching step of polymerization, thereby adding polar groups to the polymer.

3. The laminate of claim 2, wherein said oxygen containing monomers are selected from the group consisting of ethylene oxide, acrylic and methacrylic acids, acrylic and methacrylic esters, diisocyanates and epoxides.

4. The laminate of claim 1, wherein said fluorocarbon polymer comprises at least one monomer selected from tetrafluoroethylene, hexafluoropropene and vinylidene fluoride.

5. The laminate of claim 4 wherein said interlayer comprises at least one fluorocarbon polymer selected from the group consisting of homopolymers of vinylidene fluoride and copolymers of vinylidene fluoride, said copolymers comprising hexafluoropropene and/or tetrafluoroethylene monomers.

6. The laminate of claim 5, wherein said fluorocarbon polymer comprises a terpolymer of hexafluoropropene, vinylidene fluoride and tetrafluoroethylene.

7. The laminate of claim 6, wherein said fluorocarbon polymer comprises a terpolymer of:
   about 40 to 60 weight percent tetrafluoroethylene,
   about 20 to 40 weight percent hexafluoropropene, and
   about 20 to 40 weight percent vinylidene fluoride.

8. The laminate of claim 1, further comprising at least one optically transparent glass or resinous inner layer between said parallel sheets and at least one layer of an optically transparent intumescent gel on at least one side of said inner layer.

9. The laminate of claim 8, wherein said resinous inner layer is an ionomer.

10. The laminate of claim 8, wherein the laminate comprises said resinous inner layer, and further comprising an inert layer between said gel and said resinous inner layer.

11. The laminate of claim 10, wherein said inert layer comprises glass.

12. The laminate of claim 10, wherein said inert layer comprises siloxane.

13. The laminate of claim 1, wherein the two spaced parallel sheets are glass layers, and the laminate further comprises an ionomer layer between said glass layers, and an intumescent gel between the ionomer and said glass layers, wherein said modified fluorocarbon polymer is between said ionomer and said glass layer.

14. The laminate of claim 13, wherein said gel is about 0.25 to 0.50 inch in thickness.

15. The laminate of claim 1, wherein at least one of said sheets comprises polycarbonate.

16. The laminate of claim 1, further comprising two nonfluorocarbon resinous layers between said two spaced parallel sheets.

17. The laminate of claim 1, wherein said interlayer is about 50 to 60 mils in thickness.

18. A fire resistant and impact resistant transparent laminate comprising at least two spaced parallel sheets of tempered glass or glass-ceramic, and between said parallel sheets a sheet of an ionomer and at least one sheet comprising a thermoplastic fluorocarbon polymer, said fluorocarbon polymer being modified by polar groups and having a melting point in the range of about 120° to 300° C., said laminate having a thickness of about 50 mils, wherein said polar groups are selected from carboxyl groups, urethane groups and hydroxyl groups.

19. The laminate of claim 18, wherein said fluorocarbon polymer is a terpolymer of hexafluoropropene, tetrafluoroethylene and vinylidene fluoride.

* * * * *